US012793434B2

(12) United States Patent
Wimmer

(10) Patent No.: US 12,793,434 B2
(45) Date of Patent: Nov. 10, 2026

(54) METHOD AND APPARATUS FOR GENERATING GROUND TRUTH FOR OTHER ROAD PARTICIPANT

(71) Applicant: Robert Bosch GmbH, Stuttgart (DE)

(72) Inventor: Andreas Wimmer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/723,418

(22) PCT Filed: Dec. 8, 2022

(86) PCT No.: PCT/EP2022/084956
§ 371 (c)(1),
(2) Date: Jun. 22, 2024

(87) PCT Pub. No.: WO2023/126142
PCT Pub. Date: Jul. 6, 2023

(65) Prior Publication Data

US 2025/0166392 A1 May 22, 2025

(30) Foreign Application Priority Data

Dec. 31, 2021 (CN) ........................ 202111662568.6

(51) Int. Cl.
*G06V 20/58* (2022.01)
*B60R 11/04* (2006.01)
(Continued)

(52) U.S. Cl.
CPC .............. *G06V 20/58* (2022.01); *B60R 11/04* (2013.01); *G06T 5/50* (2013.01); *G06T 7/70* (2017.01); *G06T 2207/20221* (2013.01)

(58) Field of Classification Search
CPC ...... G06V 20/588; G06V 10/96; G06V 20/56; G06V 20/58; G06V 10/82; G06V 2201/08;
(Continued)

(56) References Cited

U.S. PATENT DOCUMENTS

2020/0324795 A1* 10/2020 Bojarski ................ G06N 20/20
2022/0383545 A1* 12/2022 Wachtel ............. G01C 21/3885

OTHER PUBLICATIONS

International Search Report corresponding to PCT Application No. PCT/EP2022/084956, mailed Feb. 3, 2023. (4 pages).
(Continued)

*Primary Examiner* — Masum Billah
(74) *Attorney, Agent, or Firm* — Maginot, Moore & Beck LLP

(57) ABSTRACT

A method for generating a ground truth for other road participant(s) is disclosed. The method includes (i) receiving first image information about surroundings of a vehicle from first-type cameras mounted on the vehicle, (ii) extracting second image information about other road participant(s) from the first image information, and (iii) generating a ground truth for the other road participant(s) based at least on the second image information. The ground truth is used to validate a sensed value about the other road participant(s) collected by a second-type camera mounted on the vehicle. In addition, an apparatus for generating a ground truth for other road participant(s), a computer storage medium, and a computer program product vehicle are disclosed.

19 Claims, 3 Drawing Sheets

(51) Int. Cl.
*G06T 5/50* (2006.01)
*G06T 7/70* (2017.01)

(58) Field of Classification Search
CPC .. G06V 10/449; G06V 10/774; G06V 10/776; G06V 10/803; G06V 10/143; G06V 10/147; G06V 10/16; G06V 10/95; G06V 20/584
USPC .......................................................... 348/148
See application file for complete search history.

(56) References Cited

OTHER PUBLICATIONS

Zhou, Wei et al., Automated Evaluation of Semantic Segmentation Robustness for Autonomous Driving, Arxiv.org, Cornell University Library, 201 Olin Library Cornell University Ithaca, NY, 14853, Oct. 24, 2018, 12 pages, XP080927273.

Muresan, Mircea Paul et al., Stabilization and Validation of 3D Object Position Using Multimodal Sensor Fusion and Semantic Segmentation, Sensors, vol. 20, No. 4, Feb. 18, 2020, 33 pages, XP055982375.

Ma, Bing et al., Simultaneous Detection of Lane and Pavement Boundaries Using Model-Based Multisensor Fusion, IEEE Transactions on Intelligent Transportation Systems, IEEE, Piscataway, NJ, vol. 1, No. 3, Sep. 1, 2000, pp. 135-147, XP011028376.

* cited by examiner

METHOD AND APPARATUS FOR GENERATING GROUND TRUTH FOR OTHER ROAD PARTICIPANT

This application is a 35 U.S.C. § 371 National Stage Application of PCT/EP2022/084956, filed on Dec. 8, 2022, which claims the benefit of priority to Serial No. CN 2021 1166 2568.6, filed on Dec. 31, 2021 in China, the disclosures of which are incorporated herein by reference in their entirety.

The present disclosure relates to the field of vehicles, in particular to a method and an apparatus for generating a ground truth for other road participant, a computer storage medium, and a computer program product vehicle.

BACKGROUND

In vehicle automation related functions (for example, L0-L5 automatic drive functions), the precision of vehicle-mounted sensors' perception of information about surroundings of a vehicle (for example, information about other road participant(s)) is very important. In the development and validation of these functions, the collected information is often compared with the ground truth of the vehicle's surroundings. Such ground truth is also called reference value.

If a manual labeling method is used to generate the ground truth, it will lead to high labor costs and take a long time. If information collected by a lidar sensor is used to generate the ground truth, the precision of the ground truth cannot be guaranteed in some scenarios such as rain, snow, foggy weather. If the same sensor (e.g., a front facing camera), which is used for the sensed value to be validated, is used to generate the ground truth, the precision of the validation result is also difficult to be guaranteed. This is because errors or omissions caused by the inherent defects of the sensor would exist in both the ground truth and the sensed value generated by the same sensor. Therefore, these errors or omissions cannot be detected by comparing the two.

SUMMARY

According to an aspect of the present disclosure, a method for generating a ground truth for other road participant(s) is provided. The method comprises: receiving first image information about surroundings of a vehicle from first-type cameras mounted on the vehicle; extracting second image information about other road participant(s) from the first image information; and generating the ground truth for the other road participant(s) based at least on the second image information. Wherein the ground truth is used to validate a sensed value about the one or more other road participants collected by a second-type camera mounted on the vehicle.

Additionally and alternatively, in the foregoing method, the ground truth is further used to validate a sensed value about the one or more other road participants collected by other types of sensors mounted on the vehicle.

Additionally and alternatively, the foregoing method may further comprise performing a coordinate system conversion on the second image information; and generating the ground truth based at least on the converted second image information.

Additionally and alternatively, in the foregoing method, during the coordinate system conversion, the second image information is converted from a two-dimensional image coordinate system to a three-dimensional vehicle coordinate system.

Additionally and alternatively, in the foregoing method, the first-type cameras mounted on the vehicle comprise at least two first-type cameras located at different positions of the vehicle. The method further comprises: extracting second images of the at least two first-type cameras from first image information from the at least two first-type cameras, respectively; fusing the second images of the at least two first-type cameras; and generating the ground truth based at least on fused second image information.

Additionally and alternatively, the foregoing method further comprises: fusing, based on positioning information of the vehicle at different times, the second image information about the other road participant(s) extracted at the different times; and generating the ground truth based at least on the fused second image information.

Additionally and alternatively, in the foregoing method, the ground truth is generated based on the second image information and third image information about the other road participant(s) from other types of sensors.

Additionally and alternatively, the foregoing method further comprises generating a ground truth for a relative position between the other road participant(s) and driving boundaries.

According to another aspect of the present disclosure, an apparatus for generating a ground truth for other road participant(s) is provided. The apparatus comprises: a receiving device configured to receive first image information about surroundings of a vehicle from first-type cameras mounted on the vehicle; an extracting device configured to extract second image information about other road participant(s) from the first image information; and a generating device configured to generate the ground truth of the other road participant(s) based at least on the second image information. Wherein the ground truth is used to validate a sensed value about the one or more other road participants collected by a second-type camera mounted on the vehicle.

Additionally and alternatively, in the foregoing apparatus, wherein the ground truth is further used to validate a sensed value about the one or more other road participants collected by other types of sensors mounted on the vehicle.

Additionally and alternatively, the foregoing apparatus further comprises a conversion device. The conversion device is configured to perform a coordinate system conversion on the second image information. The generating device is further configured to generate the ground truth based at least on the converted second image information.

Additionally and alternatively, in the foregoing apparatus, the conversion device is further configured to convert the second image information from a two-dimensional image coordinate system to a three-dimensional vehicle coordinate system.

Additionally and alternatively, the foregoing apparatus further comprises a first fusion device. The first-type cameras mounted on the vehicle comprise at least two first-type cameras located at different positions of the vehicle. The extracting device is further configured to extract second images of the at least two first-type cameras from the first image information from the at least two first-type cameras, respectively. The first fusion device is configured to fuse the second images of the at least two first-type cameras. The generating device is further configured to generate the ground truth based at least on the fused second image information.

Additionally and alternatively, the foregoing apparatus further comprises a second fusion device. The second fusion device is configured to fuse, based on positioning information of the vehicle at different times, the second image information about the other road participant(s) extracted at the different times. The generating device is further configured to generate the ground truth based at least on the fused second image information.

Additionally and alternatively, in the foregoing apparatus, the generating device is further configured to generate the ground truth based on the second image information and third image information about the other road participant(s) from other types of sensors.

Additionally and alternatively, in the foregoing apparatus, the generating device is further configured to generate a ground truth for a relative position between the other road participant(s) and driving boundaries.

According to another aspect of the present disclosure, a computer storage medium is provided. The medium comprises instructions for implementing the forgoing method when being executed.

According to still another aspect of the present disclosure, a computer program product is provided, which comprises a computer program. The computer program, when executed by a processor, implements the foregoing method.

According to yet another aspect of the present disclosure, a vehicle comprising the foregoing apparatus is provided.

The solution for generating other road participant(s) according to the embodiments of the present disclosure uses first-type cameras to collect image information for other road participant(s), and processes the collected image information to generate a ground truth. The solution for generating other road participant(s) is precise, saves time and labor costs, and can flexibly fuse image information collected by other types of sensors.

BRIEF DESCRIPTION OF THE DRAWINGS

In conjunction with the following detailed description of the accompanying drawings, the above and other objectives and advantages of the present disclosure will become more complete and clear, wherein the same reference numerals are used to denote the same or similar elements. The drawings are not necessarily drawn to scale.

DETAILED DESCRIPTION

The solution for generating a ground truth for other road participant(s) according to various exemplary embodiments of the present disclosure will be described in detail hereinafter with reference to the accompanying drawings.

It should be noted that, in the context of the present disclosure, the terms "first", "second", etc. are used to distinguish similar objects, and are not necessarily used to describe a specific order or sequence. In addition, unless specifically indicated otherwise, in the context of the present disclosure, the terms "comprising", "having" and similar expressions are intended to mean non-exclusive inclusion.

Figure 1:
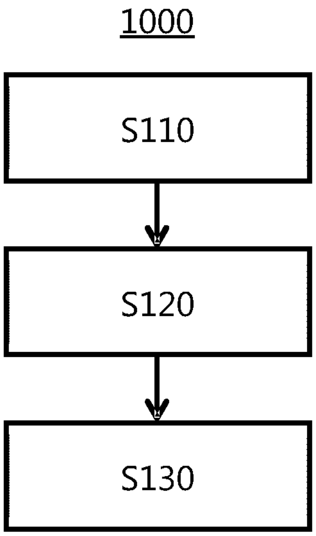
FIG. 1 shows a schematic flowchart of a method 1000 for generating a ground truth for other road participant(s) according to an embodiment of the present disclosure.
Figure 2A:
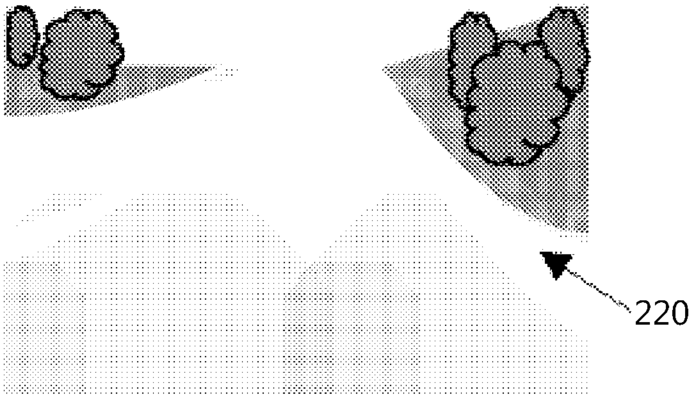
FIGS. 2(*a*)-(*d*) show first image information received from four first-type cameras mounted on a vehicle, respectively.
Figure 2B:
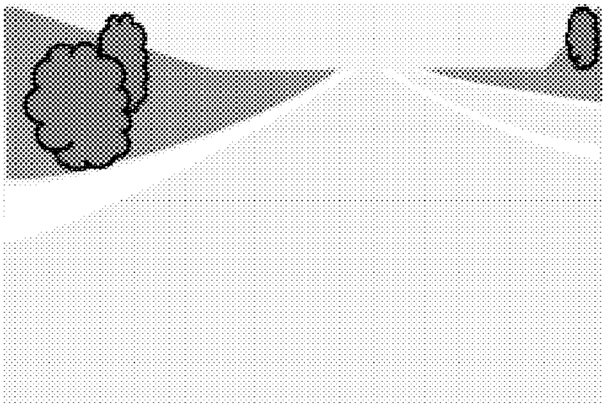
Figure 2C:
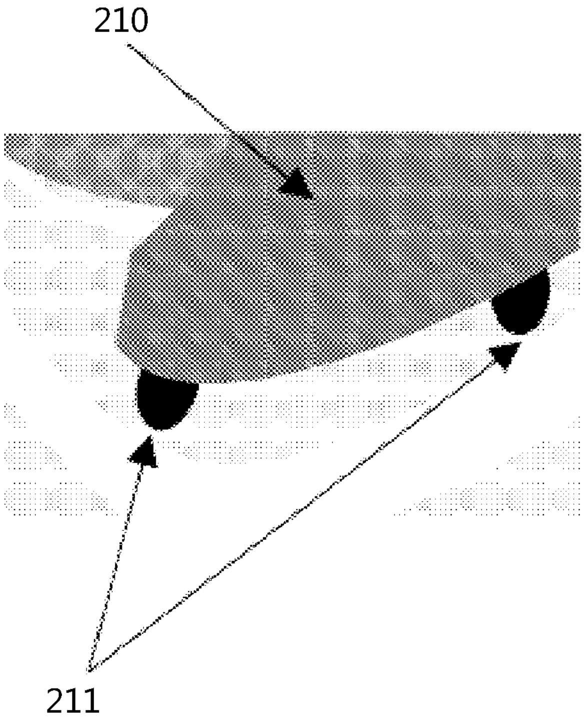
Figure 2D:
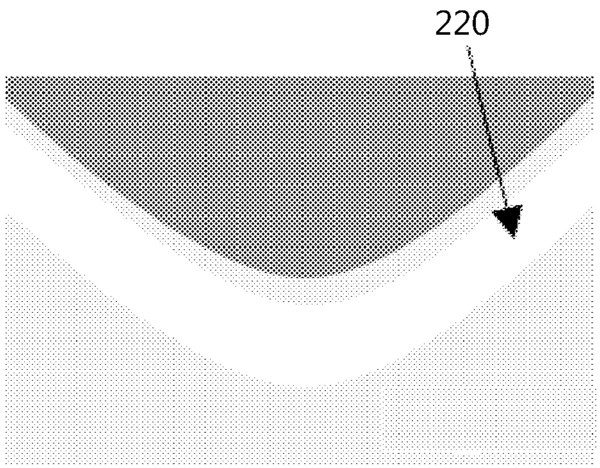

FIG. 1 shows a schematic flowchart of a method 1000 for generating a ground truth for other road participant(s) according to an embodiment of the present disclosure. As shown in FIG. 1, the method 1000 for generating a ground truth for other road participant(s) comprises the following steps.

In step S110, first image information about surroundings of a vehicle is received from one or more first-type cameras mounted on a vehicle.

In the context of the present disclosure, the term "other road participant(s)" is intended to mean other participants on the road other than the vehicle itself, for example, other vehicles on the road (including various passenger vehicles such as cars, sports utility vehicles, etc., and various commercial vehicles such as buses, trucks, etc.), pedestrians on the road and other participants. In the context of the present disclosure, "ground truth for other road participant(s)" generally refers to the ground truth for the location, size, appearance, type and other information of the "other road participant(s)".

In addition, in the context of the present disclosure, the term "first-type camera" refers to a camera that is different from a second-type camera to be validated. For example, a second-type camera to be validated may be a front facing camera used in an Advanced Driving Assistant System (ADAS). Accordingly, a first-type camera may be a fisheye camera mounted on the vehicle, or a wing camera mounted on the vehicle. Wherein, a fisheye camera may be a camera mounted on the vehicle originally for the reversing function. Generally, a fisheye camera can have a higher resolution for a sensing object in a short distance, so that a reference value with a higher precision is generated in the subsequent step S130. Wherein, wing cameras may be cameras mounted on both sides of the vehicle (for example, on the rearview mirrors on both sides) for sensing images on both sides of the vehicle.

Those skilled in the art appreciate that, in step S110, the first image information may be directly received from the vehicle-mounted first-type cameras, or may be indirectly received from other memories and controllers (e.g., electronic control unit (ECU), domain control unit (DCU)). The present disclosure does not make any limitations in this regard.

In step S120, second image information about other road participant(s) is extracted from the first image information received in step S110.

Conventional image processing methods can be utilized to extract the second image information, for example, the edge filter algorithm, the Canny edge detection algorithm, the Sobel operator edge detection algorithm, and the like. Machine learning and artificial intelligence algorithms can also be utilized to extract the second image information, for example, neural networks, deep learning, and the like. The present disclosure does not make any limitations in this regard.

In step S130, a ground truth for other road participant(s) is generated based at least on the second image information extracted in step S120. As mentioned above, the generated ground truth for other road participant(s) may be the ground truth for the location, size, appearance, shape and other information of other road participant(s). In an example where the other road participant is a vehicle, the location of the vehicle may be determined by the location of one or more wheels of the vehicle. In an example where the other road participant is a pedestrian, the position of the pedestrian may be determined by the position of the pedestrian's feet.

Any appropriate method for target detection or estimation, such as machine learning, deep learning, etc., can be utilized to generate the ground truth for other road participant(s). The present disclosure does not make any limitations to the specific generating algorithms.

The generated ground truth can be used to compare with a sensed value of the same other road participant(s) collected by other vehicle-mounted sensors to test and calculate the precision of other vehicle-mounted cameras' perception of the other road participant(s), and their perception performance in error triggering events. Here, "error triggering event" is intended to mean typical events in which other vehicle-mounted cameras are prone to perception errors, such as rain, snow, and fog scenarios.

In one embodiment, the ground truth generated in step S130 may also be used to validate the sensed value about the other road participant(s) collected by other types of sensors mounted on the vehicle. Other types of sensors may be, for example, lidar sensors, millimeter-wave radar sensors, other types of cameras other than the first and second types, and any suitable types of sensors mounted on the vehicle.

As such, the ground truth for other road participant(s) is generated based on the image information of the other road participant(s) collected by the first-type cameras, thereby providing a benchmark for validating the precision validation of other vehicle-mounted sensors.

On the one hand, the near range camera has high resolution for objects in proximity of the vehicle and can generate highly accurate ground truth. On the other hand, using the ground truth generated by the near range first-type cameras to validate the sensed value generated by a second-type camera or other sensors can prevent common cause error from being overlooked in the validation. In the context of the present disclosure, "common cause error" means that the same error caused by the same factor exists in multiple sensing results by the same sensor or the same type of sensors. The same factor may be originated from the location of this sensor, or from the inherent defects of this type of sensors, for example. In the embodiment according to the present disclosure, different types of sensors are used, which often have different focal lengths, the image information collected by which is often processed by different algorithms, and which are often installed in different locations, thus having different lighting conditions. Therefore, the first-type cameras, which are different from the sensors to be validated, can be used to avoid common cause errors from being overlooked in validation such different types of sensors could prevent common cause errors from being ignored in validation.

In addition, according to the embodiments of the present disclosure, a camera capable of collecting high-quality image information of other road participant(s) near the vehicle, such as a fisheye camera, can be used as the first-type camera, so as to obtain a ground truth for the other road participant(s) with high precision. This is especially apparent in scenes such as rain, snow, and fog.

FIGS. 2(*a*)-(*d*) show first image information received from four vehicle-mounted first-type cameras (fish-eye cameras are specifically provided in this embodiment), respectively. Among them, the four vehicle-mounted first-type cameras corresponding to FIGS. 2(*a*)-(*d*) are installed on the front, rear, left, and right sides of the vehicle, respectively.

From the first image information collected by the first-type camera on the left side of the vehicle (i.e., FIG. 2(*c*)), it can be seen that there is other road participant on the left side of the vehicle, specifically a vehicle 210. The ground truth for the position of the vehicle 210 can be generated by extracting the second image information about the vehicle 210 from FIG. 2(*c*), and based on the second image information. The ground truth for the position can be determined, for example, by wheels 211 of the vehicle 210.

It can be seen from the first image information collected by the first-type cameras on the front and right sides of the vehicle (i.e., FIGS. 2(*a*), (*d*)) that both contain lane markings 220 at the same position.

It can be seen from the first image information collected by these four first-type cameras (i.e., FIGS. 2(*a*)-(*d*)) that, a fisheye camera, as a wide-angle camera, can collect image information with a large field of view. However, an image with such a large field of view has a certain degree of distortion, and therefore, the image information can be corrected and compensated accordingly.

Although not shown in FIG. 1, the method 1000 may further comprise a coordinate system conversion of the image information. For example, the second image information extracted in step 120 is converted from a two-dimensional image coordinate system to a three-dimensional vehicle coordinate system (e.g., a Cartesian coordinate system), so as to facilitate further processing of the second image information (for example, to compare and fuse with three-dimensional image information collected by other sensors). Accordingly, in step S130, the ground truth for other road participant(s) is generated based at least on the converted second image information.

It should be noted that in the context of the present disclosure, coordinate system conversion of image information is not limited to the conversion of the second image information, and conversion may also be performed on image information generated in other steps (e.g., the first image information). For example, coordinate system conversion may first be performed on the first image information before the extraction step S120. In some cases, this is beneficial to outlier detection and plausibilisation of image information.

In addition, in the context of the present disclosure, coordinate system conversion of image information is not limited to the conversion from image coordinate system to vehicle coordinate system, but may also cover mutual conversions among the various coordinate systems of camera coordinate system, image coordinate system, world coordinate system, vehicle coordinate system, and the like. It depends on the specific image processing requirements.

As described above in conjunction with FIG. 2, first image information about surroundings of a vehicle can be received from multiple first-type cameras installed at different positions of the vehicle. Accordingly, in step S120, second image information can be extracted from the first image information from each first-type camera. For example, second image information can be extracted in FIGS. 2(*a*)-(*d*), respectively. The method 1000 may further comprise fusing the second image information of each first-type camera (not shown in FIG. 1). Accordingly, in step S130, a ground truth for other road participant(s) can be generated based at least on the fused second image information.

Alternatively, the first image information from multiple first-type cameras can also be fused before the second image information is extracted. Then, in step S120, the second image information is extracted from the fused first image information, and in step S130, a ground truth for other road participant(s) is generated based on the second image information.

Therefore, by fusing the image information collected by multiple first-type cameras, the precision of the generated ground truth for other road participant(s) can be further improved. This is especially apparent for the overlapping parts of the fields of view of multiple first-type cameras.

It will be appreciated that, the image information collected by all of the vehicle-mounted first-type cameras can be fused, or the image information collected by a subset of the first-type cameras can be fused. For example, in the embodiment shown in FIGS. 2(*a*)-(*d*), the image information in FIGS. 2(*a*) and (*d*) can be fused to generate the ground truth of the lane markings 220. That is, the image information collected by a subset of the four first-type cameras (the front one and the right one) is fused to generate the ground truth of the lane markings 220.

In addition, although not shown in FIG. 1, the method 1000 may also comprise fusing, based on positioning information of a vehicle at different times, second image information about the same other road participant(s) extracted at the different times. Accordingly, in step S130, a ground truth for other road participant(s) is generated based at least on the fused second image information.

The processing of the foregoing steps is usually carried out in a time frame manner. Even when the vehicle is traveling, the image information of other road participant(s) at the same location around the vehicle generally does not exist in a single time frame alone, but in multiple time frames before and after. Thus, fusing, based on the positioning information of a vehicle at multiple times, the image information of the same other road participant(s) collected at the multiple times, can compensate for errors and omissions in single-frame image information and effectively improve the precision of ground truth for other road participant(s) that is ultimately generated.

It should be noted that positioning information of a vehicle at different times can be determined by means of global positioning, such as global navigation satellite system (GNSS), global positioning system (GPS); it can also be determined by the positioning methods of the vehicle itself, such as onboard odometry sensor, which determines the position change of the vehicle by determining the change in the distance between the vehicle and a reference object; it can also be determined by a combination of any of the above methods. The present disclosure does not make any limitations in this regard.

Similar to the above, fusion of the image information of the same other road participant(s) collected at different times is not limited to following the extraction of the second image information, while it can also occur before the extraction of the second image information. In other words, the first image information of the same other road participant(s) collected at different times can first be fused. Then, in step S120, second image information is extracted from the fused first image information, and in step S130, a ground truth for other road participant(s) is generated based on the second image information.

Although not shown in FIG. 1, the method 1000 may further comprise generating a ground truth for the other road participant(s) based on second image information from first-type cameras and third image information about the same other road participant(s) from other types of sensors. Using the coordinate system conversion operation as described above, image information from different types of sensors can be converted to the same coordinate system (e.g., a Cartesian coordinate system), so as to fuse image information from different types of sensors. Here, other types of sensors may be any types of sensors that can collect the image information of the same other road participant(s), such as lidar sensors, millimeter-wave radar sensors, ultrasonic sensors, other types of cameras and the like, or a combination of the foregoing various types of sensors. Generating a ground truth using image information collected by different types of sensors can prevent the inherent defects of a single type of sensor from affecting the generated ground truth, and further improve the precision of the ground truth for other road participant(s) that is ultimately generated.

It should be noted that different types of sensors often collect image information at different times. Therefore, information such as the location and moving direction of other road participant(s) can be dynamically tracked to achieve the fusion of image information from different types of sensors. That is, image information from different types of sensors can be fused based on the positioning information of a vehicle at different times. The positioning information of the vehicle at different times can be determined in the manner described above, and will not be repeated here.

Besides other road participant(s), on the road where a vehicle is travelling, usually there are also driving boundaries. In the context of the present disclosure, the term "driving boundaries" is intended to mean road boundaries within which a vehicle can travel, for example, lane markings, curbs, and the like. The relative position between the driving boundaries and other road participant(s) is often an important consideration in evaluating the driving environment and determining the next control strategy.

Therefore, although not shown in FIG. 1, the method 1000 may also comprise generating a ground truth for the relative position between other road participant(s) and the driving boundaries, for example, the ground truth for the relative position between the vehicle 210 and the lane markings 220 in FIG. 2(*a*)-(*d*).

In one embodiment, fourth image information about other road participant(s) and driving boundaries is extracted from the first image information received in step S110, and a ground truth for the relative position between the two is generated based on the fourth image information.

In another embodiment, a ground truth for other road participant(s) (e.g., refer to step S130) and a ground truth for driving boundaries are generated, respectively, and then a ground truth for the relative position between the other road participant(s) and the driving boundaries are generated by fusing the ground truths of the two. Those skilled in the art appreciate that the ground truth for other road participant(s) and the ground truth for driving boundaries can be generated by using the same type of sensors (e.g., both using first-type cameras); or by using different types of sensors (e.g., the ground truth for other road participant(s) is generated by first-type cameras, and the ground truth for driving boundaries is generated by lidar sensors, millimeter wave radar sensors, ultrasonic sensors or other types of cameras).

It will be appreciated that, although FIG. 1 and the above description describe the various operations (or steps) as sequential processing, many of these operations can be implemented in parallel, concurrently, or simultaneously. In addition, the order of various operations can be rearranged. Moreover, the embodiments of the present disclosure may also include additional steps not included in FIG. 1 and the above description.

Those skilled in the art appreciate that the method of generating a ground truth for other road participant(s) provided by one or more of the above embodiments can be implemented by a computer program. For example, the computer program is included in a computer program product. When the computer program is executed by a processor, the method for generating a ground truth for other road participant(s) according to one or more embodiments of the present disclosure is implemented. For another example, when a computer storage medium (such as a USB flash drive) storing the computer program is connected to a computer, the method for generating a ground truth for other road participant(s) according to one or more embodiments of the present disclosure can be implemented by executing the computer program-.

Figure 3:
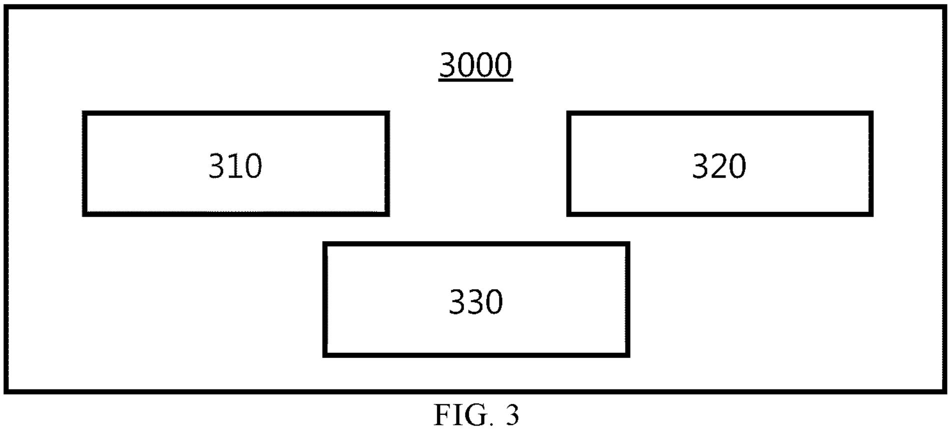
FIG. 3 shows a schematic structural diagram of an apparatus 3000 for generating a ground truth for other road participant(s) according to an embodiment of the present disclosure.

FIG. 3 shows a schematic structural diagram of an apparatus 3000 for generating a ground truth for other road participant(s) according to an embodiment of the present disclosure. As shown in FIG. 3, the apparatus 3000 for generating a ground truth for other road participant(s) comprises: a receiving device 310, an extracting device 320 and a generating device 330. Wherein, the receiving device 310 is configured to receive first image information about surroundings of a vehicle from vehicle-mounted first-type cameras. Optionally, the receiving device 310 may be configured to receive the first image information respectively from four vehicle-mounted first-type cameras described above in conjunction with FIG. 2. The extracting device 320 is configured to extract second image information about other road participant(s) from the first image information. The generating device 330 is configured to generate a ground truth for other road participant(s) based at least on the second image information.

In the context of the present disclosure, the term "other road participant(s)" is intended to mean other participants on the road other than the vehicle itself, for example, other vehicles on the road (including various passenger vehicles such as cars, sports utility vehicles, etc., and various commercial vehicles such as buses, trucks, etc.), pedestrians on the road and other participants. In the context of the present disclosure, "ground truth for other road participant(s)" generally refers to the ground truth for the location, size, appearance, type and other information of the "other road participant(s)".

In addition, in the context of the present disclosure, the term "first-type camera" refers to a camera that is different from a second-type camera to be validated. For example, a second-type camera to be validated may be a front facing camera used in an Advanced Driving Assistant System (ADAS). Accordingly, a first-type camera may be a fisheye camera mounted on the vehicle, or a wing camera mounted on the vehicle. Wherein, a fisheye camera may be a camera mounted on the vehicle originally for the reversing function. Generally, a fisheye camera can have a higher resolution for a sensing object in a short distance, so that a reference value with a higher precision is generated in the subsequent step S130. Wherein, wing cameras may be cameras mounted on both sides of the vehicle (for example, on the rearview mirrors on both sides) for sensing images on both sides of the vehicle.

The ground truth for other road participant(s) generated by the generating device 330 may be the ground truth for the location, size, appearance, shape and other information of other road participant(s). In an example where the other road participant is a vehicle, the location of the vehicle may be determined by the location of one or more wheels of the vehicle. In an example where the other road participant is a pedestrian, the position of the pedestrian may be determined by the position of the pedestrian's feet.

The generating device 330 can be configured to generate the ground truth for other road participant(s) by utilizing any appropriate method for target detection or estimation, such as machine learning, deep learning, etc. The present disclosure does not make any limitations to the specific generating algorithms.

Although not shown in FIG. 3, the apparatus 3000 for generating a ground truth for other road participant(s) may further comprise a correction device. The correction device may be configured to perform correction and compensation on the first image information received by the receiving device 310. For example, a correction device can be used to correct the distortion in the first image information collected by a fisheye camera (e.g., the distortion in FIG. 2).

In the extracting device 320, conventional image processing methods can be used to extract the second image information, for example, the edge filter algorithm, the Canny edge detection algorithm, the Sobel Operator edge detection algorithm, and the like. Machine learning, artificial intelligence algorithms can also be used to extract the second image information, for example, neural networks, deep learning, and the like. The present disclosure does not make any limitations in this regard.

Although not shown in FIG. 3, the apparatus 3000 for generating a ground truth for other road participant(s) may further comprise a conversion device. The conversion device is configured to perform a coordinate system conversion on the second image information. Accordingly, the generating device 330 is configured to generate a ground truth for other road participant(s) based at least on the converted second image information. For example, the second image information extracted by the extraction device 320 is converted from a two-dimensional image coordinate system to a three-dimensional vehicle coordinate system (e.g., a Cartesian coordinate system), so as to facilitate further processing of the second image information (for example, to be fused with three-dimensional image information collected by other sensors). Accordingly, in the generating device 330, a ground truth for other road participant(s) is generated based at least on the converted second image information.

It should be noted that in the context of the present disclosure, coordinate system conversion of image information is not limited to the conversion of the second image information, and conversion may also be performed on the image information generated in other steps (e.g., the first image information). In addition, in the context of the present disclosure, coordinate system conversion of image information is also not limited to the conversion from image coordinate system to vehicle coordinate system, but may also cover mutual conversions among the various coordinate systems of camera coordinate system, image coordinate system, world coordinate system, vehicle coordinate system, and the like. It depends on the specific image processing requirements.

Although not shown in FIG. 3, the apparatus 3000 for generating a ground truth for other road participant(s) may further comprise a first fusion device. As described above in conjunction with FIG. 2, the receiving device 310 may receive first image information about surroundings of a vehicle from multiple first-type cameras installed at different positions of the vehicle. Accordingly, in the extracting device 320, second image information can be respectively extracted from the first image information of each first-type camera. For example, second image information can be respectively extracted from FIGS. 2(*a*)-(*d*). The first fusion device may be configured to fuse the second image information of each first-type camera. The generating device 330 may be configured to generate a ground truth for other road participant(s) based at least on the fused second image information.

Alternatively, the first fusion device may also be configured to fuse first image information from multiple first-type cameras. Accordingly, the extracting device 320 extracts second image information from the first image information fused by the first fusion device. And, the generating device may be configured to generate a ground truth for other road participant(s) based on the second image information. Thus, by fusing the image information collected by multiple first-type cameras, the precision of the generated ground truth for other road participant(s) can be improved. This is especially apparent for the overlapping parts of the fields of view of multiple first-type cameras.

It will be appreciated that, the first fusion device can fuse the image information collected by all of the vehicle-mounted first-type cameras, or fuse the image information collected by a subset of the first-type cameras. For example, in the embodiment shown in FIGS. 2(*a*)-(*d*), the image information in FIGS. 2(*a*) and (*d*) can be fused to generate the ground truth of the lane markings 220. That is, the image information collected by a subset of the four first-type cameras (the front one and the right one) is fused to generate the ground truth of the lane markings 220.

In addition, although not shown in FIG. 3, the apparatus 3000 for generating a ground truth for other road participant(s) may further comprise a second fusion device. The second fusion device is configured to fuse, based on positioning information of a vehicle at different times, second image information about the same other road participant(s) extracted at the different times. Accordingly, the generating device 330 is configured to generate a ground truth for other road participant(s) based at least on the fused second image information.

The operation of each device in the apparatus 3000 is usually performed in a time frame manner. Even when the vehicle is traveling, the image information of other road participant(s) at the same position around a vehicle generally does not exist in a single time frame alone, but in multiple time frames before and after. Thus, fusing image information of the same other road participant(s) collected at multiple times using the second fusion device can compensate for errors and omissions in single-frame image information, and effectively improve the precision of the ground truth of other road participant(s) that is ultimately generated.

Similar to the first fusion device, the fusion of the image information of the same other road participant(s) collected at different times by the second fusion device is not limited to following the extraction of the second image information by the extraction device 320, while it can also occur before the extraction of the second image information. In other words, the second fusion device can fuse the first image information of the same other road participant(s) collected at different times. Then, in the extracting device 320, the second image information is extracted from the first image information fused by the second fusion device, and in the generating device 330, a ground truth for other road participant(s) is generated based on the second image information.

The positioning information at different times of the vehicle, which is used by the second fusion device, can be determined by means of global positioning, such as Global Navigation Satellite System (GNSS), Global Positioning System (GPS); it can also be determined by the positioning methods of the vehicle itself, such as onboard odometry sensor, which determines the position change of the vehicle by determining the change in the distance between the vehicle and a reference object; it can also be determined by a combination of any of the above methods. The present disclosure does not make any limitations in this regard.

In addition, the generating device 330 may be further configured to generate a ground truth for other road participant(s) based on second image information about other road participant(s) from first-type cameras and third image information about the same other road participant(s) from other types of sensors. The coordinate system conversion device described above can be used to convert image information from different types of sensors into the same coordinate system (e.g., a Cartesian coordinate system), so that the image information from different types of sensors can be fused in the generating device 320. Here, other types of sensors can be any types of sensors that can collect the image information of the same other road participant(s), such as lidar sensors, millimeter-wave radar sensors, ultrasonic sensors, other types of cameras and the like, or a combination of the foregoing various types of sensors. Generating a ground truth using image information collected by different types of sensors can prevent the inherent defects of a single type of sensor from affecting the generated ground truth, and further improve the precision of the ground truth for other road participant(s) that is ultimately generated.

It should be noted that different types of sensors often collect image information at different times. Therefore, information such as the location and moving direction of other road participant(s) can be dynamically tracked to achieve the fusion of image information from different types of sensors. That is, image information from different types of sensors can be fused based on the positioning information of the vehicle at different times. The positioning information of the vehicle at different times can be determined in the manner described above, and will not be repeated here.

In addition, the generating device 330 may further be configured to generate a ground truth for a relative position between other road participant(s) and driving boundaries.

In one embodiment, fourth image information about other road participant(s) and driving boundaries is extracted from the first image information received in the receiving device 310, and a ground truth for the relative position between the two is generated based on the fourth image information.

In another embodiment, a ground truth for other road participant(s) and a ground truth for driving boundaries are generated, respectively, and then a ground truth for the relative position between the other road participant(s) and the driving boundaries is generated by fusing the ground truths of the two. Those skilled in the art appreciate that the ground truth for other road participant(s) and the ground truth for driving boundaries can be generated by using the same type of sensors (e.g., both using first-type cameras); or by using different types of sensors (e.g., the ground truth for other road participant(s) is generated by first-type cameras, and the ground truth for driving boundaries is generated by lidar sensors, millimeter wave radar sensors, ultrasonic sensors or other types of cameras).

In one or more embodiments, the apparatus 3000 for generating a ground truth for other road participant(s) may be integrated into a vehicle. Wherein, the apparatus 3000 for generating a ground truth for other road participant(s) may be an apparatus separately used for generating ground truth for other road participant(s) in the vehicle; or it may be combined into an electronic control unit (ECU), a domain control unit (DCU) or other processing apparatus in the vehicle. It should be appreciated that the term “vehicle” or other similar terms used herein include general motor vehicles, such as passenger vehicles (including sports utility vehicles, buses, trucks, etc.), various commercial vehicles, etc., and also include hybrid vehicles, electric vehicles, etc. A hybrid vehicle is a vehicle with two or more power sources, such as gasoline and electric powered vehicles.

In one or more embodiments, the apparatus 3000 for generating a ground truth for other road participant(s) may be integrated into the advanced driving assistance system (ADAS) or into other L0-L5 automatic drive functions of a vehicle.

The ground truth for other road participant(s) generated according to the aforementioned embodiments of the present disclosure can be used as a benchmark to compare with the sensed value for other road participant(s) sensed by other vehicle-mounted sensors. Such comparison can be used to validate and calculate the precision, average availability (e.g., true positive rate, true negative rate), and average unavailability rate (e.g., false positive rate, false negative rate) of the sensed results for other road participant(s) sensed by other vehicle-mounted sensors. Such comparison can also be used for error triggering events to validate the performance of other vehicle-mounted sensors in error triggering events.

In view of the foregoing, the solution for generating other road participant(s) according to the embodiments of the present disclosure uses first-type cameras to collect image information of the other road participant(s), and processes the collected image information multiple times to generate a highly precise ground truth for other road participant(s). Generating a ground truth using first-type cameras instead of other sensors, which are to be validated, can increase the redundancy of the system, and prevent common cause errors. In addition, compared with manually marking a ground truth, generating a ground truth using image information collected by first-type cameras can greatly reduce time and labor costs. Furthermore, the solution for generating other road participant(s) according to the embodiments of the present disclosure can also generate a ground truth by combining vehicle-mounted first-type cameras with other types of sensors, which can further improve the precision of the ground truth.

In addition, according to the embodiments of the present disclosure, a camera capable of collecting high-quality image information of other road participant(s) near the vehicle, such as a fisheye camera, can be used as the first-type camera, so as to obtain a ground truth for the other road participant(s) with high precision. This is especially apparent in scenes such as rain, snow, and fog.

It will be appreciated that, although only some of the embodiments of the present disclosure are described in the above specification, the present disclosure may, without departing from its spirit and scope, be implemented in many other forms. Therefore, the exemplified embodiments are illustrative but not restrictive. The present disclosure may, without departing from the spirit and scope of the present disclosure as defined by the appended claims, cover various modifications and substitutions.

What is claimed is:

1. A method of generating a ground truth for one or more other road participants, comprising:

receiving first image information about surroundings of a vehicle from at least two first-type cameras that are each mounted on the vehicle at different positions of the vehicle, the first image information including images from each of the at least two first-type cameras;

fusing the images from each of the at least two first-type cameras to form fused first image information;

extracting second image information about the one or more other road participants from the fused first image information;

generating the ground truth for the one or more other road participants based at least on the second image information; and validating a sensed value about the one or more other road participants collected by a second-type camera mounted on the vehicle by comparing the sensed value to the ground truth, wherein the second-type camera is a front facing camera of the vehicle that is used in an advanced driving assistant system, wherein each of the at least two first-type cameras differs from the second-type camera in both focal length and mounting position on the vehicle, wherein using the ground truth generated by the at least two first-type cameras to validate the sensed value generated by the second-type camera prevents common cause error from being overlooked in the validation, and wherein the common cause error is an error that is caused by a same factor and that exists in multiple sensing results by a same type of sensor.

2. The method according to claim 1, wherein the ground truth is further used to validate a further sensed value about the one or more other road participants collected by other types of sensors mounted on the vehicle.

3. The method according to claim 1, further comprising:

performing a coordinate system conversion on the second image information to form converted second image information, and generating the ground truth based at least on the converted second image information.

4. The method according to claim 3, wherein, in the coordinate system conversion, the second image information is converted from a two-dimensional image coordinate system to a three-dimensional vehicle coordinate system.

5. The method according to claim 1, wherein:

the images from each of the at least two first-type cameras includes a first image extracted at a first time and a second image extracted at a second time that is different from the first time, positioning information of the vehicle is determined at the first time and at the second time, fusing the images includes fusing the first image with the second image based on the positioning information of the vehicle, and the positioning information is generated using data from a global positioning system of the vehicle.

6. The method according to claim 1, wherein the ground truth is generated based on the second image information and third image information about the one or more other road participants from other types of sensors.

7. The method according to claim 1, wherein the ground truth identifies a relative position between the one or more other road participants and driving boundaries.

8. The method according to claim 1, wherein at least one of the at least two first-type cameras is a fisheye camera mounted on the vehicle and configured for imaging a reversing function of the vehicle.

9. The method according to claim 8, further comprising:

correcting distortion in the first image information from the fisheye camera prior to the fusing.

10. The method according to claim 1, wherein generating the ground truth for the one or more other road participants comprises:

when the one or more other road participants includes another vehicle, determining a location of the other vehicle based on a location of one or more wheels of the other vehicle; and when the one or more other road participants includes a pedestrian, determining a position of the pedestrian based on a position of feet of the pedestrian.

11. An apparatus for generating a ground truth for one or more other road participants, comprising:

a processor configured to:

receive first image information about surroundings of a vehicle from at least two first-type cameras that are each mounted on the vehicle at different positions of the vehicle, the first image information including images from each of the at least two first-type cameras;

fuse the images from each of the at least two first-type cameras to form fused first image information;

extract second image information about the one or more other road participants from the fused first image information;

generate the ground truth for the one or more other road participants based at least on the second image information; and validate a sensed value about the one or more other road participants collected by a second-type camera mounted on the vehicle by comparing the sensed value to the ground truth, wherein the second-type camera is a front facing camera of the vehicle that is used in an advanced driving assistant system, wherein each of the at least two first-type cameras differs from the second-type camera in both focal length and mounting position on the vehicle, wherein using the ground truth generated by the at least two first-type cameras to validate the sensed value generated by the second-type camera prevents common cause error from being overlooked in the validation, and wherein the common cause error is an error that is caused by a same factor and that exists in multiple sensing results by a same type of sensor.

12. The apparatus according to claim 11, wherein the ground truth is further used to validate a further sensed value about the one or more other road participants collected by other types of sensors mounted on the vehicle.

13. The apparatus according to claim 11, wherein the processor is further configured to:

perform a coordinate system conversion on the second image information to form converted second image information, and generate the ground truth based at least on the converted second image information.

14. The apparatus according to claim 13, wherein in the coordinate system conversion, the processor converts the second image information from a two-dimensional image coordinate system to a three-dimensional vehicle coordinate system.

15. The apparatus according to claim 11, wherein:

the images from each of the at least two first-type cameras includes a first image extracted at a first time and a second image extracted at a second time that is different from the first time, positioning information of the vehicle is determined at the first time and at the second time, the processor is further configured to (i) fuse the first image with the second image based on the positioning information, and the positioning information is generated using data from a global positioning system of the vehicle.

16. The apparatus according to claim 11, wherein the processor is further configured to generate the ground truth based on the second image information and third image information about the one or more other road participants from other types of sensors.

17. The apparatus according to claim 11, wherein the ground truth identifies a relative position between the one or more other road participants and driving boundaries.

18. A vehicle comprising the apparatus according to claim 11.

19. A non-transitory computer storage medium comprising instructions, wherein the method according to claim 1 is implemented when the instructions are being executed.

* * * * *